US006960333B2

(12) United States Patent
Blanda, Jr. et al.

(10) Patent No.: US 6,960,333 B2
(45) Date of Patent: Nov. 1, 2005

(54) HIGH PERFORMANCE HEAT EXCHANGERS

(75) Inventors: Paul Joseph Blanda, Jr., Houston, TX (US); Michael Stanley DeCourcy, Houston, TX (US)

(73) Assignee: Rohm and Haas Company, Philadelphia, PA (US)

( * ) Notice: Subject to any disclaimer, the term of this patent is extended or adjusted under 35 U.S.C. 154(b) by 89 days.

(21) Appl. No.: 10/436,521

(22) Filed: May 13, 2003

(65) Prior Publication Data

US 2003/0192680 A1 Oct. 16, 2003

Related U.S. Application Data

(62) Division of application No. 09/593,637, filed on Jun. 13, 2000, now abandoned
(60) Provisional application No. 60/141,769, filed on Jun. 30, 1999.

(51) Int. Cl.[7] .............................. C01C 3/02; F28F 19/00
(52) U.S. Cl. ..................... 423/376; 165/134.1; 423/659
(58) Field of Search ................................ 423/376, 659; 165/134.1, 174, 178

(56) References Cited

U.S. PATENT DOCUMENTS

| | | | |
|---|---|---|---|
| 1,429,149 A | 9/1922 | Lawrence | |
| 2,824,212 A | 2/1958 | Roberts | 219/117 |
| 3,215,495 A | 11/1965 | Jenks et al. | 23/151 |
| 3,317,222 A | 5/1967 | Maretzo | 285/55 |
| 3,707,186 A | 12/1972 | Zorrilla et al. | 165/134 |
| 3,769,489 A | 10/1973 | Charlesworth | 219/125 R |
| 4,036,653 A | 7/1977 | Jacobson | 106/47 R |
| 4,066,861 A | 1/1978 | Broodman | 219/61 |
| 4,191,246 A | 3/1980 | Cassell | 165/134 R |
| 4,221,263 A | 9/1980 | Meyer | 165/173 |
| 4,396,059 A | 8/1983 | Banner et al. | 165/134 R |
| 4,735,263 A | 4/1988 | Andro et al. | 165/134.1 |
| 4,943,001 A | 7/1990 | Meyer | 228/173.4 |
| 4,965,060 A * | 10/1990 | Tsukahara et al. | 423/376 |
| 5,246,063 A | 9/1993 | Fix et al. | 165/134.1 |
| 5,354,543 A | 10/1994 | Tsukahara et al. | 422/201 |
| 5,749,414 A | 5/1998 | Damsohn et al. | 165/178 |
| 5,775,269 A | 7/1998 | Lawrence | 122/511 |
| 6,656,442 B2 * | 12/2003 | Cowell et al. | 423/376 |

FOREIGN PATENT DOCUMENTS

| | | | |
|---|---|---|---|
| DE | 2639693 A1 | 3/1978 | 165/158 |
| FR | 910528 | 6/1946 | 165/174 |
| FR | 1115798 | 4/1956 | 165/174 |
| GB | 200901 | 7/1923 | 165/174 |
| JP | 357016793 A | 1/1982 | 165/158 |
| NL | 82389 | 8/1956 | 165/174 |

OTHER PUBLICATIONS

Crowley, M.S., "Hydrogen–Silica Reactions in Refractories", Ceramic Bulletin, vol. 46, No. 7, pp. 679–682 (1967), no month.
Crowley, M.S., "Hydrogen–Silica Reactions in Refractories—Part II", Ceramic Bulletin, vol. 49, No. 5, pp. 527–530 (1970), no month.
Ahmed, et al., "Failure, Repair and Replacement of Waste Heat Boiler", Ammonia Plant Safety & Related Facilities, vol. 37, pp. 100–110, American Institute of Chemical Engineers (1997), no month.
$Si_3N_4$ Ceradyne, Inc. , no month.
James, M.M., "Unexpected Metal Dusting Failure Of Waste Heat Boiler Tubes", First International Symposium On Innovative Approaches For Improving Heat Exchanger Reliability—Proceedings, Houston, Texas, Nov. 2–4, 1998.

* cited by examiner

*Primary Examiner*—Wayne A. Langel
(74) *Attorney, Agent, or Firm*—Kenneth Crimaldi; Marcella M. Bodner (57) ABSTRACT

Disclosed are means for improving the service-life of indirect tubesheet type heat exchangers used in chemical reactors, particularly those exposed to reducing, nitridizing and/or carburizing environments. Such means include the use of certain ferrules within the heat exchange tubes and/or weld types used in construction of these heat exchangers.

11 Claims, 5 Drawing Sheets

HIGH PERFORMANCE HEAT EXCHANGERS

CROSS-REFERENCE TO RELATED APPLICATION

This application is a division of prior application Ser. No. 09/593,637, filed Jun. 13, 2000, now abandoned entitled "High Performance Heat Exchangers," which claims the benefit of Provisional application Ser. No. 60/141,769, filed Jun. 30, 1999, benefit of which is claimed under 35 U.S.C. §120.

BACKGROUND OF THE INVENTION

This invention relates generally to means for improving the service-life and reliability of indirect heat exchangers used in chemical reaction systems which produce high temperature, reactive effluent gasses. In particular, this invention relates to means for improving service-life of indirect heat exchangers used in the production of hydrogen cyanide.

In many chemical processes, the reaction effluent comprises hot, reactive, and/or abrasive fluids and/or gasses. For many of these reactions, it is desirable to rapidly quench the reactor effluent to prevent decomposition of the product component(s). Quenching may be accomplished through direct contact, such as application of water sprays, or more commonly through indirect methods such as through the use of indirect heat exchangers. Because indirect heat exchangers provide the added advantage that they may be configured to recover waste heat, these are the more preferred method and have been in use for many years. Typical indirect heat exchangers used in such chemical processes consist of a shell and tube design.

In many systems, the thermal, kinetic and reactive properties of the effluent may individually or collectively serve to corrode, crack, or otherwise degrade the materials used to form the heat exchange zone. In particular, the exchange tubes and the tube-to-tubesheet welds nearest to the reaction zone see the most severe conditions and are most susceptible to degradation. For example, the hot effluent may chemically react with the metal of the heat exchange tube itself, thereby causing erosion and/or corrosion, that is, metal dusting, carburization and the like, all of which lead to failure of the heat exchanger. The weld area of the heat exchange tubes is also susceptible to stress corrosion cracking, which leads to failure of the heat exchanger. These problems may be encountered, for example, in the production of hydrogen cyanide or acrylonitrile, in nitric acid waste heat recovery exchangers, in hydrocarbon cracking units, and in tubeside fired boilers and exchangers.

The use of ferrules as a protective covering for tubes in shell and tube heat exchangers and condensers is well known. Such ferrules primarily insulate the tubes and welds but also protect the heat exchange tubes against deterioration resulting from chemical attack. Typically, heat exchangers are placed downstream of a reaction zone in a chemical reactor, such as downstream of a catalyst. Thus, the top or upper portion of the heat exchange tubes are exposed to hot effluent gasses. Certain ferrules, such as alumina, are employed to provide insulation against the heat from such gasses.

In a common application, an exchanger tube is first constructed from a base material; a second, possibly different material, selected for its properties, such as resistance to erosion and/or chemical attack, is then formed into a tube that slides inside the inlet/upstream end of the heat exchanger tube. Depending on the severity of the process conditions, the ferrules may provide a long period of maintenance-free service or alternatively, they may be sacrificial, requiring frequent replacement. In either case, the use of the ferrules provides an economical method for extending the service life of the base-material exchanger through the prevention of erosion and/or corrosion.

For example, M. James, "Unexpected Metal Dusting Failure of Waste Heat Boiler Tubes", First International Symposium on Innovative Approaches for Improving Heat Exchanger Reliability, Proceedings, Materials Technology Institute of the Chemical Process Industries, Inc., 1–13 (1998) discloses a specific ceramic ferrule design in a shell and tube reactor for use in a chemical process having reducing, carburizing and/or nitridizing conditions. In this paper, various nickel-chromium alloys (INCONEL) were used in the tubes of a heat exchanger. In each case, the INCONEL material experienced severe wastage, that is, metal dusting, at rates much higher than known rates.

Also, U.S. Pat. No. 5,775,269 discloses a boiler protection tube assembly having an inner ceramic sleeve, a ceramic block and an outer ceramic sleeve. The ceramics disclosed in U.S. Pat. No. 5,775,269 are aluminum and zirconium oxides. Such ceramics are impractical for use in heat exchangers requiring rapid quenching of very hot effluent as these materials last only a relatively short time under such temperature extremes.

Ceramics, such as alumina, silica and zirconia, are effective as insulators in such reactors as steam-methane reformers. However, they suffer from poor thermal shock resistance and may, in the case of silica, react with hydrogen, which is present in many reducing environments. See, for example, M. S. Crowley, *Hydrogen-Silica Reactions in Refractories, Ceramic Bulletin*, Vol. 46, No. 7, 679-682 (1967). Thus, these ceramic materials are unsuitable for use in chemical processes requiring rapid quenching of hot effluent gasses and/or in reducing environments, both of which are found in the production of hydrogen cyanide.

Figure 1A:
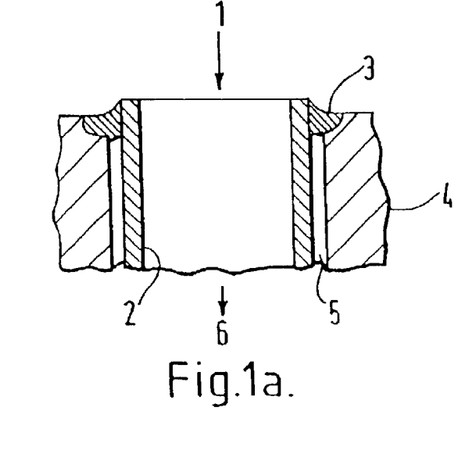
FIG. 1a shows a schematic cross-section of a typical exchange tube to tubesheet weld used in hydrogen cyanide reactors having an exaggerated annular space.
Figure 1B:
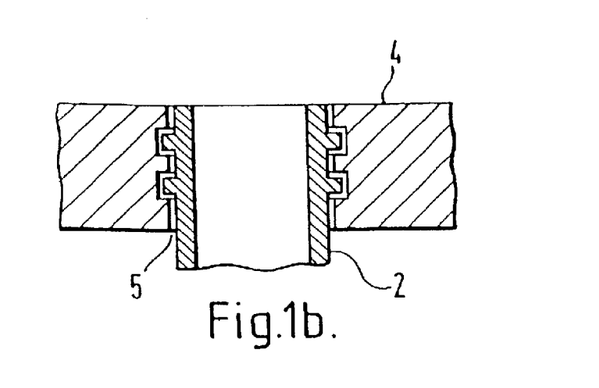
FIG. 1b shows a schematic cross-section of a rolled exchange tube to a tubesheet connection having an exaggerated annular space.

In a typical shell and tube reactor, the heat exchange tubes are attached to a tubesheet at each tube end. Typically, a tube is passed through a hole in the tubesheet until the end of the tube is approximately flush with the top surface of the tubesheet. The tube is then typically welded to the top surface of the tubesheet. Generally, the outer diameter of the tube is smaller than the inner diameter of the corresponding hole in the tubesheet. Thus, once the tube is welded to the tubesheet, an annular space remains between the tube and the tubesheet below the weld. FIG. 1a shows a typical weld 3 used in shell and tube reactors, especially reactors used for chemical processes having reducing environments, such as in the production of hydrogen cyanide. The tubes may also be affixed to the tubesheet by alternate means, such as rolling. FIG. 1b shows a typical attachment of a tube to a tubesheet by rolling.

In hydrogen cyanide production, the hot effluent gasses must be rapidly cooled from about 1000° to 1400° C. to about 600° C. or less in order to prevent decomposition of the hydrogen cyanide. As such effluent gasses are cooled, the tubesheet, weld and upper portion of the exchange tubes become very hot. As a result, any water present in the annular space 5 vaporizes and deposits any impurities contained in the water in the annular space 5. Such impurities typically are ions and minerals in the water and the like. Such impurities are also typically corrosive to the tubesheet, exchange tube, and particularly the weld. Over time, such corrosive materials buildup in the annular space 5. The combination of heat from the effluent gasses and corrosive materials with stresses in the system leads to stress corrosion cracking in the tube, weld and/or tubesheet. Such stress corrosion cracking leads to failure, and ultimately replacement, of the heat exchanger.

A number of shell and tube hydrogen cyanide reactor designs have been developed to address the problem of minimizing the heat the tubesheet, exchange tubes and weld are exposed to. FIGS. 3a–e illustrate such reactors. Each reactor is designed with high cooling water flow rates, turbulent cooling water flow, and refractory to insulate the tubesheet. However, these designs do not completely prevent such stress corrosion cracking.

Down-hole welds, or full penetration welds, have been used in chemical processes that do not have reducing environments or such rapid quenching requirements. For example, Ahmed et al., *Failure, Repair and Replacement of Waste Heat Boiler, Ammonia Plant Safety & Related Facilities*, American Institute of Chemical Engineers, Vol. 37, 100–110, discloses the use of such a weld in a horizontal heat exchanger for use in a secondary ammonia reformer. This paper does not disclose the use of this weld for any other process.

Thus, the problem of providing effective heat exchangers having a long-service life in shell and tube reactors used in chemical processes having reducing environments remains.

SUMMARY OF THE INVENTION

It has been surprisingly found that the service life of heat exchangers in shell and tube hydrogen cyanide reactors can be extended by using a ferrule, particularly a ferrule including silicon nitride, and/or by using a down-hole weld to attach the heat exchange tubes to the tubesheet.

In one aspect, the present invention is directed to a heat exchange apparatus for use in a reducing, carburizing and/or nitridizing environment including: (a) a shell having an entry tubesheet portion and an exit tubesheet portion, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident; and (c) a plurality of ferrules, each ferrule having an entry end and an exit end extending through an entry tubesheet hole into a tube wherein the exit end extends below the entry tubesheet, the ferrule including silicon nitride.

In a second aspect, the present invention is directed to a heat exchange apparatus including: (a) a shell having an entry tubesheet portion and an exit tubesheet portion, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident, each tube being formed of a metal including nickel-chromium alloy; and (c) a plurality of ferrules, each ferrule having an entry end and an exit end extending through an entry tubesheet hole into a tube wherein the exit end extends below the entry tubesheet, the ferrule including nickel-chromium alloy.

In a third aspect, the present invention is directed to a ferrule for use in a heat exchange tube wherein the ferrule has an entry end and an exit end; the entry end having an opening tapering conically into a pipe section, the outer diameter of the entry end being greater than an inner diameter of the heat exchange tube; the pipe section having an outer diameter up to 99% of the inner diameter of the heat exchange tube; the pipe section having an expanded area with an outer diameter that is substantially the same as the inner diameter of the heat exchange tube.

In a fourth aspect, the present invention is directed to a ferrule for use in a heat exchange tube wherein the ferrule has an entry end and an exit end; the entry end having an opening tapering conically or trumpet-shaped into a pipe section, the outer diameter of the entry end being greater than an inner diameter of the heat exchange tube; the pipe section having an outer diameter that is substantially the same as the inner diameter of the heat exchange tube; and wherein the ferrule has a venturi-shaped design in longitudinal cross-section.

In a fifth aspect, the present invention is directed to a heat exchange apparatus for use in a hydrogen cyanide reactor including: (a) a shell having an entry tubesheet portion and an exit tubesheet portion, each tubesheet having a plurality of holes, wherein the shell has at least one inlet and one outlet for heat exchange medium; and (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident, wherein each tube entry end is affixed to the entry tubesheet by a down-hole weld.

In a sixth aspect, the present invention is directed to an apparatus for preparing hydrogen cyanide by reacting hydrocarbon, ammonia and optionally oxygen-containing gas in the presence of a platinum-containing catalyst at a temperature in the range from 1000° to 1400° C., including a reaction zone, an optional refractory zone, and a heat exchange zone including: (a) a shell having an entry tubesheet portion and an exit tubesheet portion, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident; and (c) a plurality of ferrules, each ferrule having an entry end and an exit end extending through an entry tubesheet hole into a tube wherein the exit end extends below the entry tubesheet, the ferrule including silicon nitride.

In a seventh aspect, the present invention is directed to a process for preparing hydrogen cyanide including the steps of: feeding reaction gas to a reactor, the reaction gas including hydrocarbon, ammonia and optionally an oxygen-containing gas; reacting the reaction gas in the presence of a catalyst to give product gas; cooling the product gas in a heat exchange apparatus including (a) a shell having an entry tubesheet portion and an exit tubesheet portion, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident; and (c) a plurality of ferrules, each ferrule having an entry end and an exit end extending through an entry tubesheet hole into a tube wherein the exit end extends below the entry tubesheet, the ferrule including silicon nitride; and recovering hydrogen cyanide from the cooled product gas.

DETAILED DESCRIPTION OF THE INVENTION

As used throughout the specification, the following terms shall have the following meanings, unless the context clearly indicates otherwise. The terms "heat exchange units" and "heat exchange vessels" are used interchangeably. The terms "first" and "second" and "upper" and "lower" and "entry and exit", respectively, are used interchangeably, though it is recognized that the reactor may be in a vertical, horizontal, or other configuration in which the terms "upper" and "lower" would not be apt to describe the relation of components to one another. The term "entry" refers to that portion of the heat exchange apparatus that is nearest to the reaction zone, that is, where hot process gasses enter the heat exchange apparatus. The term "exit" refers to that portion of the heat exchange apparatus that is furthest from the reaction zone, that is, where hot process gasses exit the heat exchange apparatus. The following abbreviations are used throughout the specification: C=centigrade and cm=centimeter. All ratios and amounts are by weight, unless otherwise noted. All numerical ranges are inclusive, unless otherwise noted.

The present invention provides a solution to the problem of short service-life of shell and tube heat exchangers through the use of specific ferrules and/or welds. Preferably, the design of the ferrules of the present invention further serves to minimize the potentially damaging effects of the reactor effluent stream. In addition, the design of the heat exchanger and the use of down-hole welds in affixing the exchange tubes to the tubesheet of the apparatus simplify construction, maintenance and repair of the unit, minimizing downtime and increasing operational efficiency. The down-hole weld also eliminates the annular space between the exchange tube and the tubesheet which can serve as a crevice to concentrate corrosive agents. Thus the present invention is useful in extending the service-life of any shell and tube heat exchanger. The ferrules and welds of the present invention are particularly useful in shell and tube heat exchangers that are exposed to hot, reactive effluent gasses, and preferably where the heat exchanger is exposed to a reducing, carburizing or nitridizing environment, such as in hydrogen cyanide production.

There are numerous heat exchanger designs suitable for use with reactors producing reactive, high temperature, high abrasion effluent streams. Particularly in connection with hydrogen cyanide production, the need for quenching the hot process gasses has long been appreciated. By quenching the hot process or effluent gasses is meant cooling the gasses sufficiently such that the products contained therein do not degrade. For example, it is well known in hydrogen cyanide production that if the hot process gasses are not cooled sufficiently, the hydrogen cyanide present will degrade.

Typical heat exchange units, or vessels, useful in hydrogen cyanide production are illustrated in FIGS. 3a to 3e. These units have the following elements which are identified by like number in each figure: hot process gas inlets 1, cooled process gas outlets 6, exchanger cooling water inlet 7, exchanger cooling water outlet 8, exchanger tubesheet vent 9, tubesheet 4, heat exchange tubes 2, heat exchange vessel 10, reaction vessel 11, and refractory material 12. The refractory material 12 shields the tubesheet from direct exposure to the hot process gasses. Arrows indicate the direction of flow of gasses or cooling water.

Figure 3A:
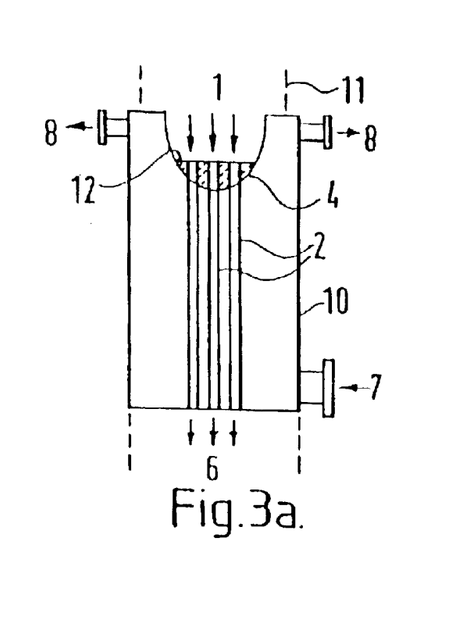
FIGS. 3a to 3e show schematic cross-sections hydrogen cyanide reactor heat exchanger designs.

The unit of FIG. 3a is configured such that the lower portion of the reactor vessel extends into and is surrounded by the heat exchange vessel. This allows the cooling water outlets to be positioned above the level of the junction of the exchange tubes and the tubesheet. The tubesheet forms a convex interior upper surface of the heat exchange vessel. The process gasses flow down and through the exchange tubes which are surrounded by the cooling water. The exchange tubes pass through the tubesheet and are welded to the tubesheet using conventional welds at the interface between the upper lip of the exchange tube and the upper surface of the tubesheet. The heated water and bubbles formed therein during the quenching of the hot process gasses are generally directed away from the exchange tubes to the cooling water outlets.

Figure 3B:
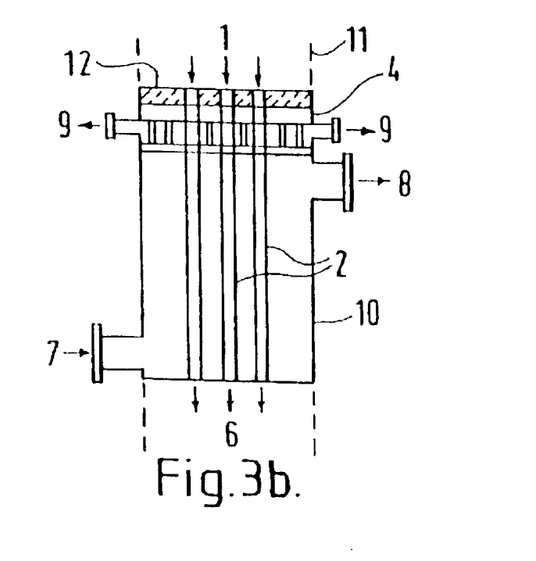

The unit of FIG. 3b has a planar tubesheet, generally of a relatively large thickness. The process gasses pass through the tubesheet and down into exchange tubes. Cooling water enters the heat exchange vessel from the bottom and primarily exits through a cooling water outlet in the upper portion of the vessel. The tubesheet contains integral channels that allow cooling water to flow through it horizontally. There are also exchanger tubesheet vents positioned at the top of the vessel, above the main outlet, which receive the water from the tubesheet channels. These vents are designed to remove the hottest water and bubbles entrained therein.

Figure 3C:
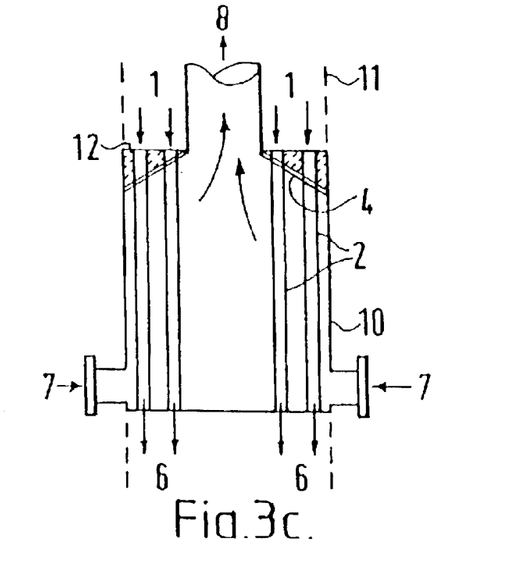

The unit of FIG. 3c utilizes the reverse orientation for the exit flow of the heat exchange medium. The tubesheet is in the form of an annulus with the exchange tubes extending down therefrom. The cooling water outlet is in the center of the annulus and carries the heated water up and out of the heat exchange vessel through center of the reactor vessel. The cooling water inlets are at the bottom of the heat exchange vessel. The upward flow of the cooling water, and the preferable slope of the tubesheet, angled upward toward the cooling water outlet promotes the removal of the heated water and entrained bubbles away from the tubesheet and the exchanger tubes.

Figure 3D:
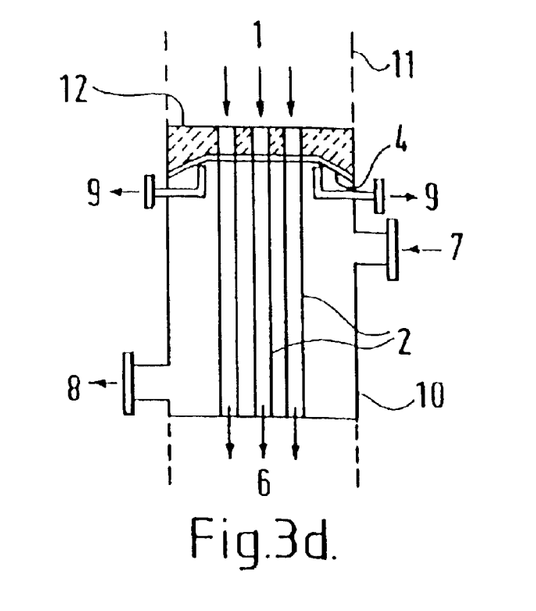

The unit of FIG. 3d provides a tubesheet with a planar upper surface and which forms a concave upper surface of the heat exchanger vessel. The cooling water enters the heat exchange vessel toward the upper portion of the vessel and exits through the cooling water outlet near the base of the vessel. The positioning of the inlet and outlet, and the concave roof of the vessel tend to direct the coolest water toward the lower surface of the tubesheet and the exchanger tubes emerging from the tubesheet. Exchanger tubesheet vents with outlets positioned near the apex of the vessel serve to remove the heated water and bubbles away from the tubesheet and exchange tubes.

Figure 3E:
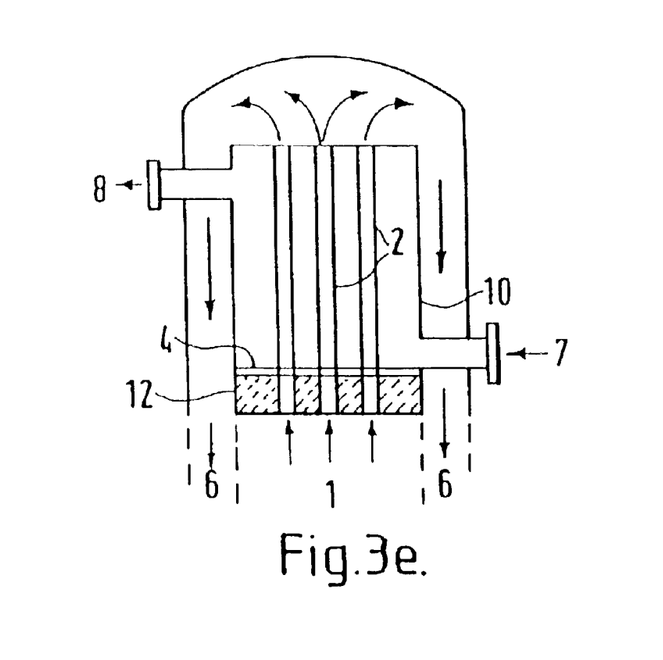

In each of the units illustrated in FIGS. 3a to 3d, the process gasses flow downward through the units. In the unit of FIG. 3e, the process gasses flow upward. In this orientation, the reaction vessel is below the heat exchange vessel. The gasses flow upward past the refractory material through the tubesheet and into the exchange tubes. Cooling water enters the heat exchange vessel at the bottom of that vessel just above the tubesheet, and is removed from an outlet near the top of that vessel. As a result, the heated water and gas bubbles, such as vaporized water, rise to the top of the vessel, that is, away from the tubesheet. However, solids in the cooling water, especially minerals, may precipitate and accumulate on the exposed upper surface of the tubesheet. Such mineral deposits create localized hotspots which promote degradation of the tubesheet, the exchange tubes and tubesheet welds adjacent thereto. An advantage of this design is that the formation of a gas layer adjacent to the tubesheet, that is a barrier to heat exchange, is minimized.

The cooling efficiency of shell and tube heat exchangers, such as those in FIGS. 3a to 3e, may be improved by the use of baffles within the shell. Such baffles direct the flow of the heat exchange medium within the shell. The size, shape and placement of the baffles within the shell are specific to the particular heat exchanger design employed. Such baffle design and placement is within the ability of one skilled in the art and such baffles may allow the water inlet(s) and outlet(s) to be reversed if desired. It will be appreciated that more than one heat exchanger may be connected in series, which may also increase the cooling of the reactor effluent.

In shell and tube heat exchangers, the tubesheets are typically from about one-eighth of an inch (0.3 cm) to about twenty inches (50 cm) thick. Such tubesheets are typically made from carbon steel, stainless steel, nickel alloys, nickel-chromium alloys, nickel-molybdenum alloys, and the like. In such shell and tube heat exchangers, the heat exchange tubes are typically from 0.5 inches (1.2 cm) to 2 inches (5 cm) in nominal diameter. The heat exchange tubes may be any length that allows for cooling of the effluent gasses or liquids. The length of the heat exchange tubes will vary depending on the heat exchanger design, the diameter of the tube, the coolant flow and the like. Thus, the tube length for a particular reactor design is well within the ability of one skilled in the art. Typical tube lengths are in the range of 4 feet (1.2 m) to 30 feet (9 m). Tubes useful in shell and tube heat exchangers are typically made from carbon steel, stainless steel, nickel alloy, nickel-chromium alloy, nickel-molybdenum alloy, and the like.

It is preferred that the heat exchange tubes are made from carbon steel or nickel-chromium alloy. Suitable nickel-chromium alloys for use in heat exchange tubes contain 40 to 80% nickel and 12 to 28% chromium. The nickel-chromium alloys may optionally contain one or more other components, such as carbon, silicon, manganese, copper, sulfur, cobalt, aluminum, iron, titanium, boron, phosphorus, molybdenum, or niobium. Suitable commercially available nickel-chromium alloys include those marketed under the INCONEL brand, available from Special Metals Corporation (New Hartford, N.Y.). Suitable INCONEL alloys include, but are not limited to: INCONEL 600, INCONEL 601, INCONEL 617, INCONEL 625, INCONEL 718, INCONEL X-750, INCONEL 751, and INCONEL MA 754. It is preferred that the nickel-chromium alloy used in the heat exchange tubes contain 71–75% nickel, 15–17% chromium, 7–11% iron, 0.2–0.35% manganese, 0.2–0.35% silicon, 0.1–0.3 copper, 0.003–0.04% carbon, and 0.001–0.01 sulfur %. Suitable preferred nickel-chromium alloy includes INCONEL 600. It is further preferred that the tubesheet and heat exchange tubes be made from the same material.

The hot process gasses and/or fluids passing through a shell and tube heat exchanger may be cooled by any heat exchange medium. Such medium enters the shell through at least one inlet, passes along the heat exchange tubes, and exits the shell through at least one outlet. Suitable heat exchange media are any that remove heat from the process gasses and/or fluids. Suitable heat exchange media include, but are not limited to: water, a mixture of water and steam, molten salt, glycol, a mixture of water and glycol, oil, such as natural or synthetic oil, gasses, such as air and process gas streams, and the like.

FIG. 1a illustrates a typical weld used to affix heat exchange tubes to the tubesheets in shell and tube heat exchangers, such as those shown in FIGS. 3a to 3e. FIG. 1a has the following elements: hot process gas inlet 1, heat exchange tube 2, weld 3, tubesheet 4, annular space 5 and cooled process gas outlet 6. The annular space 5 extends up through the tubesheet and ends at the lower surface of the weld 3 affixing the exchange tube 2 to the tubesheet 4. As the the cooling water enters the annular space 5, it vaporizes, and deposits any impurities contained in the water in the annular space 5. Such impurities typically are ions and minerals in the water and the like. Such impurities are also typically corrosive to the tubesheet, exchange tube, and particularly the weld. Over time, such corrosive materials buildup in the annular space 5. The combination of heat from the effluent gasses and the corrosive materials along with stresses in the system leads to stress corrosion cracking in the tube, weld and/or tubesheet. Heat treating the weld area minimizes the potential for stress corrosion cracking in the weld, particularly in nickel-chromium alloy welds. However, such heat treating does not eliminate stress corrosion cracking in the tubes and/or tubesheet. Such stress corrosion cracking leads to failure, and ultimately replacement, of the heat exchanger.

Other methods of affixing exchange tubes to tubesheets, such as rolling, are known. In rolling, an end of the heat exchange tube is rolled into a mating groove inside the tubesheet hole. FIG. 1b shows a typical rolled connection of an exchange tube to a tubesheet. Such rolling methods are well known to those skilled in the art. When a tube is affixed to a tubesheet by rolling, a small annular space 5 remains between the exchange tube 2 and the tubesheet 4 which can also result in stress corrosion cracking. Such rolling may be combined with welds as shown in FIG. 1a for additional mechanical strength. However, such combination does not eliminate stress corrosion cracking.

The heat exchange vessels used in reactors having reactive, hot process gasses, such as hydrogen cyanide reactors, have been designed to minimize such stress corrosion cracking. For example, each of the heat exchange vessels illustrated in FIGS. 3a to 3d has a design that facilitates cooling of the effluent gasses. Each design provides for high cooling water flow rates, turbulent cooling water flow and optional refractory to insulate the upper tubesheet from the hot effluent gasses. By efficiently cooling the effluent gasses, these designs reduce the rate of corrosion. However, these designs do not eliminate corrosion.

The upward flow orientation of the unit of FIG. 3e reduces the particular problem noted above, that is, the concentration of corrosive agents in the annular space, since hot water and vapor rise away from the tubesheet, and the exchange tube welds. However, this configuration still suffers from the effect of deposits of minerals and other precipitants from the cooling water. These materials can also find their way into the crevice between the tubesheet openings and the exchange tubes and cause damage to those components as well as the weld.

Therefore, known heat exchange vessel designs used in reactors having reactive, hot process gasses do not solve the problem of the concentration of corrosive materials, and thus do not solve the problem of stress corrosion cracking.

Figure 2A:
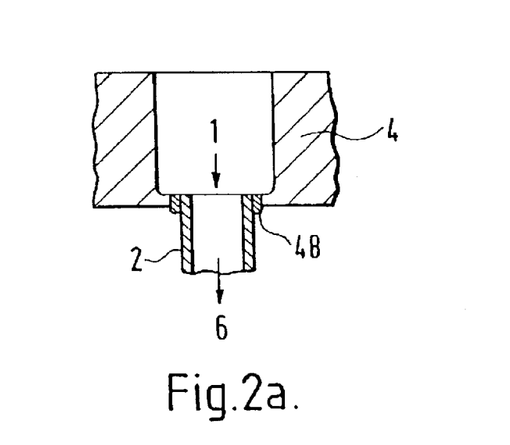
FIG. 2a shows a schematic cross-section of a tubesheet and exchange tube affixed by a down-hole weld having an exaggerated annular space.

The down-hole weld of the present invention greatly reduces stress corrosion cracking in heat exchangers having reactive, hot process gasses, such as hydrogen cyanide reactors, nitric acid waste recovery exchangers and acrylonitrile reactors. FIG. 2a illustrates a down-hole weld useful in the present invention. FIG. 2a has the following elements: hot process gas inlet 1, heat exchange tube 2, weld 48, tubesheet 4 and cooled process gas outlet 6. In a down-hole weld, the top of a heat exchange tube is affixed to the lower side of a tubesheet with a full-penetration weld. Thus, the annular space is eliminated and concentrations of corrosive materials are greatly reduced. The use of down-hole welds greatly increases the service-life of shell and tube heat exchangers, particularly those used in hydrogen cyanide production, by reducing stress corrosion cracking. The down-hole weld is preferably used in hydrogen cyanide reactors having heat exchange units as illustrated in FIGS. 3a to 3e, and more preferably as illustrated in FIGS. 3a to 3d.

The down-hole weld useful in the present invention may be formed by any conventional means, such as that described in U.S. Pat. No. 4,221,263. It will be appreciated that the exchange tubes may be fitted in a variety of ways to the tubesheet for welding. For example, the tubes may fit into a counterbore or socket on the lower surface of the tubesheet and may be welded from either the inside of the tube to the tubesheet or on the outside of the tube to the lower surface of the tubesheet. See, for example, U.S. Pat. No. 4,221,263. It is preferred that the down-hole weld used is that illustrated by FIG. 2a.

Figure 2B:
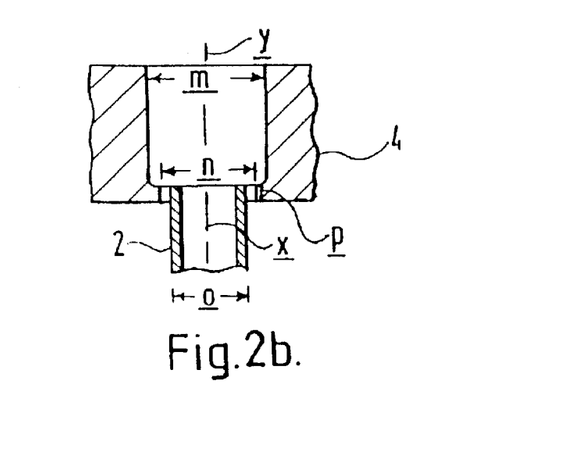
FIG. 2b shows a schematic cross-section of a tubesheet and exchange tube situated for a down-hole weld having an exaggerated annular space.

In preparing the preferred down-hole weld of the present invention, a hole having a diameter m is drilled almost completely through the tubesheet along an axis y, see FIG. 2b. A smaller hole having a diameter n is then drilled through the remainder of the tube sheet along the axis y. The diameter n is sufficiently large that the exchange tube 2 can be inserted through the hole. The exchange tube is then inserted into the tube sheet such that the exchange tube axis x and the tubesheet hole axis y are coincident. The exchange tube 2 is inserted into the tubesheet hole a distance p from the lower face of the tubesheet. The distance p is equal to the length of the tubesheet hole having the diameter n. The distance p may be any length that provides sufficient area for welding the tube to the tubesheet. Typically, the distance p is less than one-half the thickness of the tubesheet, and preferably less than one-third the thickness of the tubesheet. Once the tube is inserted into the tubesheet, a full-penetration weld is formed between the tube and the tubesheet by any conventional means. It will be appreciated by one skilled in the art that the holes in the tubesheet having diameters m and n may be made in one or more drilling steps.

The down-hole welds of the present invention are typically heat treated. In such heat treatments, the weld and surrounding metal area are heated. The methods of heat treatment employed are those appropriate to the particular metals welded. Such heat treatment methods are well known to those skilled in the art.

Reactor components are also subject to destructive thermal, chemical and physical agents resulting from the various chemical processes employed. Heat exchange tubes are particularly exposed to such agents. For example, in hydrogen cyanide production, the resulting hydrogen cyanide gas produced must be cooled quickly in order to minimize degradation. In such reactors, the heat exchanger unit is placed as close to the catalyst and reaction zone as possible. Thus, the upper portion of the heat exchange tubes, that is, that portion nearest the catalyst and reaction zone, is continuously exposed to reactive, hot, effluent gasses having a reducing, carburizing and/or nitridizing environment. Optional refractory material, such as ceramic, is placed on the upper surface of the tube sheet, that is, nearest the catalyst and reaction zone. Such optional refractory material insulates the tubesheet from the heat of the reaction. However, such optional refractory material does not typically cover the heat exchange tubes, which are thus exposed to the heat and chemical species generated by the reactor.

One approach to increasing the service-life of heat exchangers exposed to such harsh environments is to insulate the heat exchange tubes, typically by placing ceramic ferrules through the tubesheet into the upper end of the heat exchange tubes. Such ferrules typically only protect the tubes from heat, but not necessarily from chemical and physical agents. For example, ceramic ferrules of silica, alumina and zirconia are known to provide thermal protection. However, such ferrules fail to provide adequate protection against chemical and physical agents under the harsh environments of hydrogen cyanide reactors, nitric acid waste recovery exchangers, acrylonitrile reactors, tube-side fired boilers, tube-side fired exchangers or catalyst crackers. Under these environments, the ferrules typically used, including known ceramic ferrules, are sacrificial, meaning that they degrade and must be monitored and replaced on a regular basis.

Another approach to increasing the service-life of heat exchange tubes exposed to such harsh environments is to make the heat exchange tubes from an alloy resistant to the reactor environment, such as nickel-chromium alloys. However, heat exchange tubes made from such nickel-chromium alloys are still susceptible to such problems as metal dusting.

It has been surprisingly found that using ferrules including nickel-chromium alloy or silicon nitride greatly increase the service-life of shell and tube heat exchangers, particularly those used in hydrogen cyanide production. It is preferred that the ferrules useful in the present invention include silicon nitride.

Suitable nickel-chromium alloys for use in the ferrules of the present invention are those disclosed in U.S. Pat. No. 5,354,543, or any other commercially available alloy. It is preferred that the nickel-chromium alloys useful in the present invention contain 40 to 80% nickel and 12 to 28% chromium. The nickel-chromium alloys may optionally contain one or more other components, such as carbon, silicon, manganese, copper, sulfur, cobalt, aluminum, iron, titanium, boron, phosphorus, molybdenum, or niobium. Suitable commercially available nickel-chromium alloys useful in the present invention include those marketed under the INCONEL brand, available from Special Metals Corporation (New Hartford, N.Y.). Suitable INCONEL alloys useful in the present invention include, but are not limited to: INCONEL 600, INCONEL 601, INCONEL 617, INCONEL 625, INCONEL 718, INCONEL X-750, INCONEL 751, and INCONEL MA 754. It is preferred that the nickel-chromium alloy contains 71–75% nickel, 15–17% chromium, 7–11% iron, 0.2–0.35% manganese, 0.2–0.35% silicon, 0.1–0.3 copper, 0.003–0.04% carbon, and 0.001–0.01% sulfur. Suitable preferred nickel-chromium alloy includes INCONEL 600.

The silicon nitride ferrules useful in present invention are any that include silicon nitride ($Si_3N_4$) or silicon nitride alloys. Suitable silicon nitride materials useful in the ferrules of the present invention include, but are not limited to: silicon nitride, ceramics containing silicon nitride whiskers or silicon nitride alloys. Suitable ceramics containing silicon nitride whiskers include, but are not limited to: alumina, zirconia, and the like. Any silicon nitride alloy is suitable for use in the present invention. Such silicon nitride alloys include those containing up to 5% carbon, such as those disclosed in U.S. Pat. No. 4,036,653, herein incorporated by reference to the extent it teaches the preparation of such silicon nitride alloys. It is preferred that the silicon nitride ferrule contains at least 95% silicon nitride ($Si_3N_4$), and more preferably at least 97% silicon nitride, and most preferably at least 99% silicon nitride. It is further preferred that the silicon nitride be hot pressed during manufacture.

The ferrules of the present invention may be any shape that fits into a heat exchange tube of a shell and tube heat exchanger. Thus, it will be appreciated by one skilled in the art that the outer diameter of the ferrule is less than the inner diameter of a heat exchange tube. The outer diameter of the ferrule may be anywhere from substantially the same as the inner diameter of the exchange tube so as to provide a snug fit to significantly smaller than the inner diameter of the exchange tube so as to provide a very loose fit. One skilled in the art will easily determine the ferrule outer diameter necessary for a given heat exchange tube design. By substantially the same is meant that an outer diameter of a ferrule or any part thereof is small enough to fit within an exchange tube or tubesheet hole while providing an effective seal between the ferrule or part thereof and the exchange tube or tubesheet hole. The ferrules of the present invention typically have a nominal diameter in the range of 0.5 to 2 inches (1.2 to 5 cm) and preferably 0.75 to 1.75 inches (1.9 to 4.4 cm).

The ferrules of the present invention are inserted into heat exchange tubes such that the upper surface of the entry ends of the ferrules, that is the ends closest to the reaction zone of the reactor, are at least flush with the upper surface of the entry tubesheet. It is preferred that the entry ends of the ferrules of the present invention extend above the upper surface of the tubesheet. It is further preferred that the entry ends of the ferrules extend above the optional refractory layer. When employed, such refractory layer is typically from 1 to 24 inches (2.5 to 60 cm) thick. By extending the ferrule above the optional refractory layer, erosion of the optional refractory layer by the hot effluent is reduced. Thus, the length of the ferrule is dependent upon the heat exchanger design and the amount and type of refractory material, if any, employed.

It will also be appreciated by one skilled in the art that the ferrule be mounted or inserted into an exchange tube in such a way as to prevent the ferrule from sliding all the way down the tube, that is, away from where the protection it affords is needed. It is preferred that the entry end of the ferrules of the present invention, that is the end closest to the reaction zone of the reactor, have a means for holding the ferrule in place. Suitable holding means include, but are not limited to: lips, rims, ridges, flanges, flarings, clamps or the like. It is preferred that the ferrules of the present invention have a lip or a flared or conical entry end, and more preferably a flared or conical entry end.

The ferrules of the present invention must have a length at least equal to the thickness of the entry tubesheet used in the heat exchanger. Otherwise, the length of the ferrule is not critical. If the ferrule is a sacrificial ferrule, meaning that it is expected to be worn away during use, it is preferred that the ferrule be longer than necessary so as to prolong reactor run time before having to replace the ferrule. The actual ferrule length is dependent upon the particular effluent gasses in the reactor as well as the design of the heat exchanger, and such is within the skill of one in the art. It is preferred that the ferrules of the present invention have sufficient length to extend below the tubesheet. It will be appreciated that the more efficient the cooling medium is, the shorter the length of the ferrule can be that extends below the tubesheet. It is preferred that the ferrule extends from 0.5 to 4 inches (1.2 to 10 cm) below the tubesheet. Typically, the ferrules useful in the present invention have an overall length in the range of from 1 to 30 inches (2.5 to 76 cm), preferably from 2 to 20 inches (5 to 50 cm).

The ferrules of the present invention may be used as is or may be wrapped with an additional insulation layer. Any fiber type material with low thermal conductivity is suitable for use as wrapping insulation. Suitable insulation includes, but is not limited to: alumina, zirconia, silica, and the like. Such insulation may be in the form of a blanket, gauze, tape, and the like. For example, suitable insulation includes silica paper, Fiberfrax®-Durablanket manufactured by Unifrax Corporation of Niagara Falls, N.Y., and Altra® Refractory Blanket from Rath Performance Fibers, Inc., of Wilmington, Del. and the like.

Suitable ferrule designs are illustrated in FIGS. 4 to 7. These ferrules have the following elements which are identified by like number in each figure: entry end 13, exit end 14, hot process gas inlet 15, and cooled process gas outlet 16. Arrows indicate the direction of gas flow.

Ferrules suitable for use in the present invention include those having an insulating design. Such insulating ferrules have an entry end and an exit end; the entry end having an opening tapering conically into a pipe section, the outer diameter of the entry end being greater than an inner diameter of the heat exchange tube; the pipe section having an outer diameter that is not more than 99% of the inner diameter of the heat exchange tube; the pipe section having an expanded area with an outer diameter that is substantially the same as the inner diameter of the heat exchange tube.

Figure 4A:
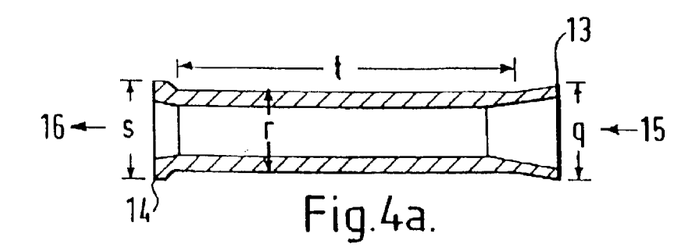
FIG. 4a shows a schematic cross-section of a ferrule providing an insulating gas space.
Figure 4B:
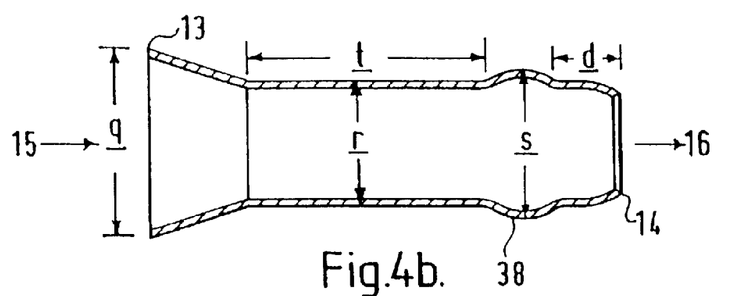
FIG. 4b shows a schematic cross-section of a ferrule having a conical entry end and an expanded diameter in one section of the pipe.

Examples of alternate embodiments of insulating ferrules are illustrated in FIGS. 4a and 4b. The ferrules of FIGS. 4a and 4b have a conical entry end 13 having an outer diameter q which is generally larger than the inner diameter of a heat exchange tube or the corresponding tubesheet hole and thus holds the ferrule in place. The ferrules of FIGS. 4a and 4b have pipe sections having a length t and an outer diameter r that is up to 99% of the inner diameter of the heat exchange tube. In FIG. 4a, the expanded area is the exit end 14 and has an outer diameter s that is substantially the same as the inner diameter of the heat exchange tube so as to form an effective seal around the ferrule when it is placed in a heat exchange tube. In FIG. 4b, the ferrule has an expanded area 38 disposed between the pipe section and the exit end 14. The expanded area 38 has an outer diameter s that is substantially the same as the inner diameter of the heat exchange tube so as to form an effective seal around the ferrule when it is placed in a heat exchange tube. In FIG. 4b, the exit end 14 is a distance d from the expanded area. Such distance d is not critical.

It will be appreciated by one skilled in the art that the expanded area of the insulating ferrules of the present invention may be disposed anywhere along the length of the ferrule. The closer the expanded area is to the entry end, the shorter the insulating layer will be. More than one expanded area may be disposed along the length of the ferrule. The expanded areas of the insulating ferrules of the present invention may be bulbous projections, ridges, lips, flanges, flarings, and the like. When the expanded area is not at the exit end, it is preferred that the end curves slightly inward, as shown in FIG. 4b. Such inwardly curving end is particularly useful as an outer ferrule in a two-ferrule system. Such expanded areas may be integral with the ferrule or may be separate components that are subsequently attached, such as by cementing, to the ferrules prior to being placed in an exchange tube.

Insulating ferrules of the present invention have the advantage of trapping gas in the annular space defined by ferrule exterior pipe section and the inner tube wall. Such trapped gas provides an insulation layer to protect the heat exchange tube, and possibly the tubesheet hole and weld, from the heat of the process gasses. The width of the annular space is equal to the difference between the outer diameter of the ferrule pipe section r and the inner diameter of the heat exchange tube. It is preferred that the pipe section of the insulating ferrules of the present invention has an outer diameter in the range of 85 to 99% of the inner diameter of the heat exchange tube, and preferably in the range of 90 to 98%. The insulating ferrules of the present invention may be any metal, including bimetallics, ceramic or ceramic clad metal. Suitable metals or ceramics include, but are not limited to: nickel-molybdenum alloy, nickel-chromium alloy, silicon nitride, zirconia, alumina, carbon steel, 300 series stainless steel, 400 series stainless steel, monel and the like. Preferred metals or ceramics include silicon nitride, carbon steel or nickel-chromium alloy. If the outer surface of the ferrules of the present invention have a converging/diverging shape, it will be appreciated these may also provide an insulating annular space for trapped gas, equivalent to that illustrated in FIGS. 4a and 4b.

In another embodiment, the ferrules of FIGS. 4 and 4b may be wrapped with insulation along the pipe section t. Any fiber type material suitable as insulation for the ferrules as described above may be used. Such wrapping may increase the insulating capabilities of the ferrule.

Figure 5:
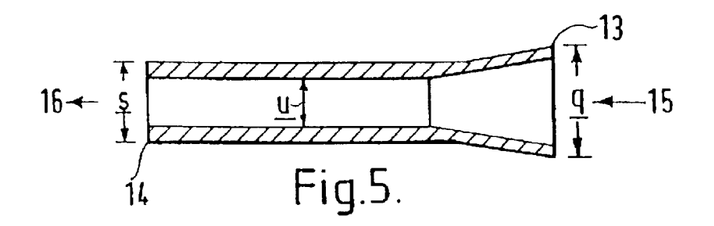
FIG. 5 shows a schematic cross-section of a ferrule having a conical entry end and a straight exit end.

The ferrule of FIG. 5 has a conical entry end 13 having an outer diameter q which is generally larger than the inner diameter of a heat exchange tube or the corresponding tubesheet hole and thus holds the ferrule in place. The pipe section of the ferrule has the same diameter as the exit end 14 which has an outer diameter s that is substantially the same as the inner diameter of the heat exchange tube. The inner diameter u of the pipe section is uniform along the length of the pipe section. The silicon nitride ferrules useful in the present invention and having the general shape illustrated in FIG. 5 are generally commercially available as nozzles for sand blasting, such as from Ceradyne, Inc. (Costa Mesa, Calif.).

Figure 6:
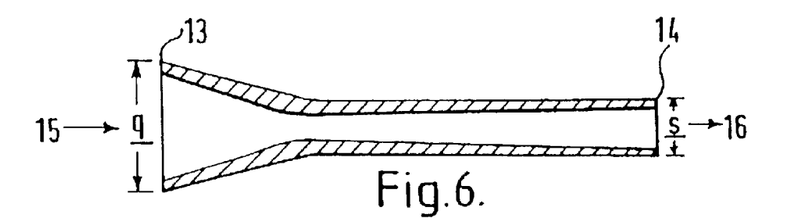
FIG. 6 shows a schematic cross-section of a ferrule having a converging/diverging design.
Figure 7:
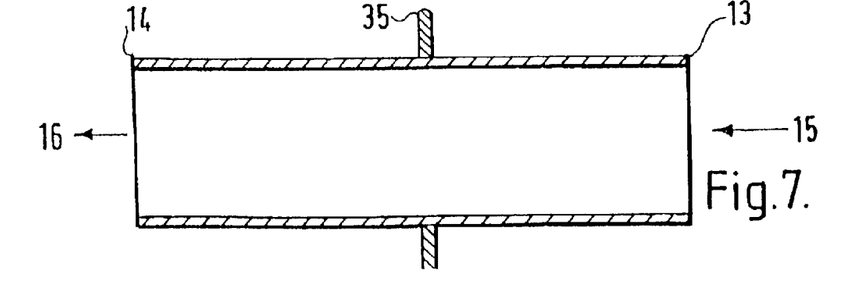
FIG. 7 shows a schematic cross-section of a ferrule having a straight bore.

FIG. 6 shows one embodiment of a venturi shaped ferrule having a conical entry end 13 having an outer diameter q which is generally larger than the inner diameter of a heat exchange tube or the corresponding tubesheet hole and thus holds the ferrule in place. The pipe section of the ferrule has the same outer diameter as the exit end 14 which has an outer diameter s that is substantially the same as the inner diameter of the heat exchange tube. The inner diameter of the pipe section gradually increases from the base of the conical entry end to the exit end 14. The inner geometry of the venturi-shaped ferrules of the present invention is that of a converging/diverging nozzle. In these venturi-shaped ferrules, the entry end may be either conical or trumpet-shaped, and preferably conical. In the venturi-shaped ferrules having a conical end, the cone angle is typically between 19 and 23 degrees. The diverging angle in the venturi-shaped ferrules of the present invention is typically less than 30 degrees. The diverging angle is preferably between 5 and 7 degrees. Such venturi-shaped ferrules have the advantage of minimizing tube wall erosion through reduced turbulence in the effluent gasses and/or liquids entering the heat exchange tubes as well as low pressure drop through the ferrule. The venturi-shaped ferrules of the present invention may be made from any metal, including bimetallics, ceramic or ceramic clad metal. Suitable metals or ceramics include, but are not limited to: nickel-molybdenum alloy, nickel-chromium alloy, silicon nitride, zirconia, alumina, carbon steel, 300 series stainless steel, 400 series stainless steel, monel and the like. Preferred metals or ceramics include silicon nitride, carbon steel or nickel-chromium alloy, FIG. 7 shows a ferrule having a straight bore and an outer lip 35. The inner diameter of the entry end 13 and the exit end 14 are substantially the same. The inner diameter of the ferrule is substantially uniform along its length. The outer lip 35 provides a means to hold the ferrule in place, either on top of the tubesheet or on top of the refractory layer. Thus, such outer lip 35 has an outer diameter that is larger than the inner diameter of the heat exchange tube employed. It will be appreciated that the outer lip 35 may be placed anywhere along the length of the ferrule. However, such ferrule designs are susceptible to fracture when subjected to thermal shock, such as those encountered in a hydrogen cyanide reactor.

The nickel-chromium alloy and silicon nitride ferrules of the present invention may effectively be used with tubesheets and tubes made from carbon steel, stainless steel, nickel alloys, nickel-chromium alloys, nickel-molybdenum alloys, and the like. It is preferred that the nickel-chromium alloy ferrules of the present invention are used in heat exchangers having nickel-chromium alloy tubesheet and heat exchange tubes. The nickel-chromium ferrules of the present invention are effective in providing chemical, physical and thermal protection to the tubes. The silicon nitride ferrules are very effective in providing thermal protection as well as chemical and physical protection to the tubesheet, welds and exchange tubes with virtually no degradation at all in all environments. The silicon-nitride ferrules of the present invention are particularly effective in protecting tubesheets, tubes and welds from chemical and physical degradation in reducing, carburizing and/or nitridizing environments, such as in hydrogen cyanide reactors.

In another embodiment, turbulators, also called twisted tape, may be added to the ferrules of the present invention that do not have a venturi-shape in longitudinal cross-section. Such turbulators are typically a separate element that slides into, or is otherwise inserted into, the ferrules of the present invention and may extend past the exit of the ferrules into the tubes. Such turbulators impart a corkscrew flow pattern to the effluent gasses entering the heat exchanger. Such a flow pattern reduces the formation of a stagnant boundary layer of gas at the tube wall, thus improving the overall heat transfer of the exchanger tube. Thus, the process gasses will be quenched more quickly. Suitable turbulators include helical and double-helical inserts. Such inserts may be made of metal, such as carbon steel, stainless steel, nickel alloy, nickel-molybdenum alloy and nickel-chromium alloy.

In yet another embodiment, the ferrules of the present invention may be rifled. By rifling is meant that a helical groove, ridge or other protrusion is added to the inside of the ferrule. Such a ridge has the advantage of imparting a corkscrew flow pattern to the effluent gasses entering the heat exchanger. Such rifling is typically in the form of a helix or a double helix. Such rifling may be achieved by grinding, grooving, or the like the inside wall of the ferrules of the present invention. Alternatively, the ridge may be formed during the casting of the ferrule.

In still another embodiment, the ferrules are placed in sleeves prior to inserting the ferrules into the heat exchange tubes. The sleeves for use with the ferrules of the present invention are typically a short hollow cylinder, such as a section of exchanger tube. Such sleeves have the advantage of holding the ferrules at a specified height above the tubesheet while optional castable refractory is installed. This allows the ferrule to extend to the top of or above the optional refractory material placed on the top of the tubesheet. When ferrule sleeves are used, the ferrule length must be increased to account for the length of the ferrule above the tubesheet, so that the exit end of the ferrule extends to at least the bottom of the tubesheet. The sleeves may be made of any material that can support the ferrule until the refractory material is put in place. Thus, the ferrule sleeves may be ceramic, such as alumina, silica, zirconia, silicon nitride and ceramic reinforced with silicon nitride whiskers; metal, such as carbon steel, stainless steel, nickel alloys, nickel-chromium alloys and nickel-molybdenum alloys; wax; plastic, paper, cardboard and the like. It is preferred that the sleeve is ceramic or metal, and more preferably silicon nitride or nickel-chromium alloy.

Such sleeves need only support the ferrule until the refractory material is added to the top of the tubesheet. When pre-cast refractory is used, ferrule sleeves are not required.

In certain applications or reactor designs, it may be desirable to use a multiple-ferrule system, such as a two-ferrule system. A two-ferrule system includes an inner ferrule, typically chosen for its insulating capability and/or chemical resistance, and an outer ferrule, primarily chosen for its durability. Suitable inner ferrules include ceramics, such as alumina, zirconia, silicon nitride, alumina reinforced with silicon nitride whiskers, zirconia reinforced with silicon nitride whiskers, and the like. It is preferred that the inner ferrule is silicon nitride. The outer ferrule may be made of any material. Suitable outer ferrule material includes, but is not limited to: carbon steel, stainless steel, nickel, nickel-chromium alloy, nickel-molybdenum alloy, silicon nitride, and the like. It is preferred that the outer ferrule is carbon steel, stainless steel, nickel-chromium alloy and silicon nitride. It is preferred that the outer ferrule is an insulating ferrule of the present invention.

Figure 9:
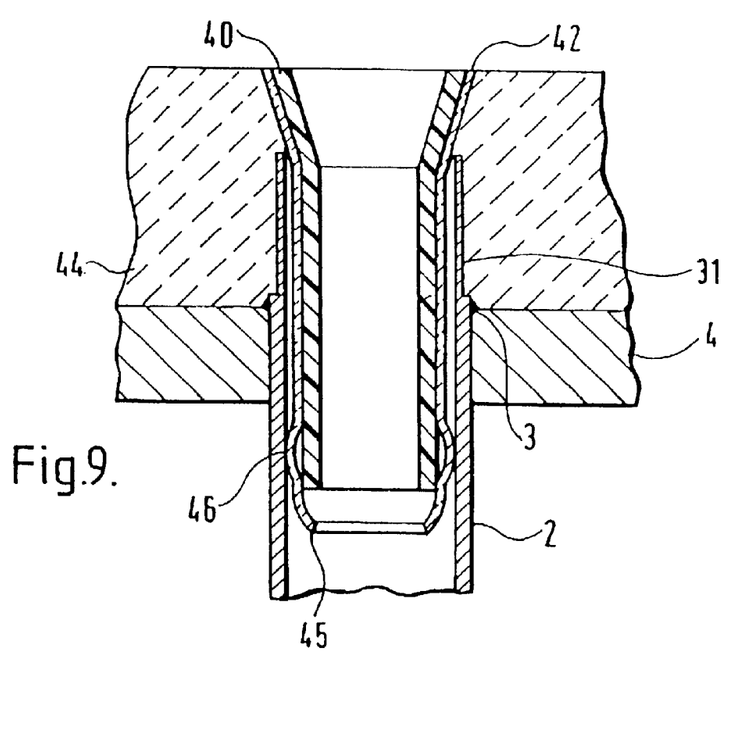
FIG. 9 shows a schematic cross-section of a two-ferrule system with a ferrule sleeve in a heat exchange tube.

FIG. 9 illustrates a two-ferrule system having an inner ferrule 40 disposed within an insulating outer ferrule 42 having an expanded area 46. The two-ferrule system is supported by ferrule sleeve 31 and rests in an opening in the refractory layer 44. The two-ferrule system passes through an opening in the entry tubesheet 4 and enters the entry end of exchange tube 2. Exchange tube 2 is attached to the upper surface of the entry tubesheet 4 by a conventional weld 3.

An advantage of silicon nitride ferrules is that they are chemically compatible with the atmospheres of the effluent gasses in many chemical reactors. Further, the silicon nitride ferrules of the present invention can be used in systems where the effluent gasses are decomposed by exposure to catalytic metals in the heat exchange tubes, for example, in certain hydrogen cyanide reactors. The silicon nitride ferrules of the present invention are particularly useful in reactors which may contain one or more of the following effluent gasses: hydrogen, nitrogen, oxides of nitrogen, oxygen, carbon monoxide, carbon dioxide, ammonia, methane and other gaseous hydrocarbons.

Thus, the ferrules and/or down-hole weld of the present invention are preferably used to extend the service-life of shell and tube heat exchangers used in hydrogen cyanide reactors, such as in the Andrussow or Degussa B-M-A processes, nitric acid waste heat recovery exchangers, acrylonitrile reactors, titanium dioxide reaction systems, ammonia reaction and/or boiler systems, phosphoric acid reaction systems, sulfuric acid reaction systems, ethylene quench exchangers, tube-side fired boilers, tube-side fired exchangers, waste incinerators or catalyst crackers. It is more preferred that the present invention is used to extend the service-life of shell and tube heat exchangers in hydrogen cyanide reactors, nitric acid waste recovery exchangers and acrylonitrile reactors, and most preferably in hydrogen cyanide reactors. Thus, the invention is well suited to reactors producing hydrogen cyanide by reacting hydrocarbon, ammonia and optionally oxygen-containing gas in the presence of a platinum-containing catalyst.

In one embodiment, the present invention provides a heat exchange apparatus having increased service life including (a) a shell having an entry tubesheet portion and an exit tubesheet portion, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident, wherein each tube entry end is affixed to the entry tubesheet by a down-hole weld; and (c) a plurality of ferrules, each ferrule having an entry end and an exit end extending through an entry tubesheet hole into a tube wherein the exit end extends below the entry tubesheet, the ferrule including silicon nitride or nickel-chromium alloy. It is preferred that the exchange tubes include nickel-chromium alloy. It is further preferred that the ferrule includes silicon nitride.

In another embodiment, the present invention provides a heat exchange apparatus having increased service life including (a) a shell having an entry tubesheet portion and an exit tubesheet portion, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident, wherein each tube entry end is affixed to the entry tubesheet by a down-hole weld; and (c) a plurality of ferrules, each ferrule having an entry end and an exit end extending through an entry tubesheet hole into a tube wherein the exit end extends below the entry tubesheet, the ferrule having a venturi-design in longitudinal cross-section and includes silicon nitride or nickel-chromium alloy. It is preferred that the exchange tubes include nickel-chromium alloy. It is further preferred that the ferrule includes silicon nitride.

In yet another embodiment, the present invention provides a heat exchange apparatus having increased service life including (a) a shell having an entry tubesheet portion and an exit tubesheet portion, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident, wherein each tube entry end is affixed to the entry tubesheet by a down-hole weld; and (c) a plurality of ferrules, each ferrule having an entry end and an exit end extending through an entry tubesheet hole into a tube wherein the exit end extends below the entry tubesheet, wherein the ferrule has an entry end and an exit end; the entry end having an opening tapering conically or trumpet-shaped into a pipe section, the outer diameter of the entry end being greater than an inner diameter of the heat exchange tube; the pipe section having an outer diameter up to 99% of the inner diameter of the heat exchange tube; the exit end of the ferrule having an outer diameter that is substantially the same as the inner diameter of the heat exchange tube; and wherein the ferrule includes silicon nitride or nickel-chromium alloy. It is preferred that the ferrule includes silicon nitride. It is also preferred that the ferrule is wrapped with insulation. It is further preferred that the exchange tubes include nickel-chromium alloy.

In a typical system for the production of hydrogen cyanide, reaction gas including hydrocarbon(s), such as methane, ethane, methanol, and the like, ammonia and optionally an oxygen-containing gas are fed into a reactor and reacted in the presence of a catalyst, for example, a platinum-containing catalyst, at a temperature in the range from about 1000° to about 1400° C. When the reaction includes an oxygen-containing gas, it is preferred that catalyst is an ammoxidation catalyst. The reactants are generally heated to the reaction temperature in the presence of the catalyst. The high-temperature effluent gasses, that is product gasses, contain the hydrogen cyanide product. However, as discussed above, the effluent gasses must be quenched to bring the temperature below about 600° C. in order to lessen the decomposition of the hydrogen cyanide. This is done by passing the effluent gasses out of the reaction zone into a heat exchange zone through one or more ferrules communicating with exchange tubes of the heat exchange zone. In the heat exchange zone, the heat of the effluent is transferred to the material of the exchange tubes and then to a heat exchange medium surrounding the outer surface of the exchange tubes, thereby lowering the effluent fluid to a suitable temperature and recapturing thermal energy of the system for further use in the reactor or elsewhere in the operations.

Figure 8:
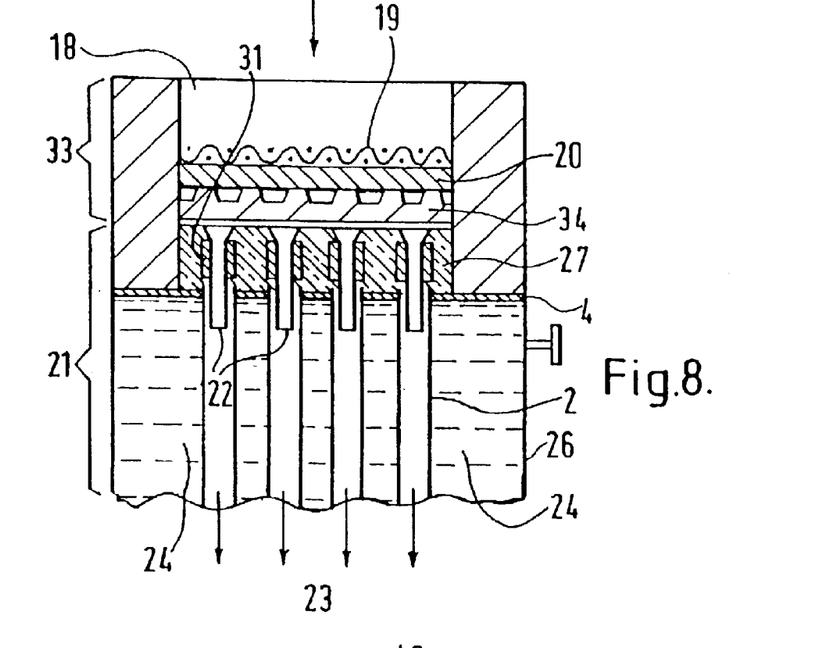
FIG. 8 shows a schematic cross-section of a shell and tube heat exchanger including ferrules and ferrule sleeves.

This process is illustrated in FIG. 8 which shows that reactants 17 enter the reaction zone 18. In the reaction zone 18, the reactants come into contact with the catalyst 19, for example heated platinum metal gauze catalyst, supported on one or more layers of catalyst support, here layers 20 and 34. The catalyst support may be, for example, a honeycomb shape with or without ridges or a foam with or without ridges. Suitable catalyst support material includes, but is not limited to metallic support screen, pre-cast ceramic or refractory, cast-in-place refractory, ceramic foam, ceramic packing, silicon dioxide (silica—$Si_2$), silicon carbide (SiC), silicon nitride ($Si_3N_4$), silicon boride, silicon boronitride, aluminum oxide (alumina—$Al_2O_3$), aluminosilicate (mullite—$3Al_2O_3·2SiO_2$), aluminoborosilicate, carbon-fiber, refractory fiber, zirconium oxide ($ZrO_2$), yittrium oxide ($Y_2O_3$), calcium oxide (CaO), magnesium oxide (MgO), Cordite ($MgO—Al_2O_3—SiO_2$), or combinations thereof. The hot, reactive effluent, containing hydrogen cyanide, exits the reaction zone 18, entering the heat exchange zone 21 through ferrules 22. The hot, reactive effluent passes through the ferrules 22, into the exchange tubes 2 which are surrounded by heat exchange medium 24. While passing through the exchange tubes 2, the effluent gasses are rapidly cooled from a temperature in the range from about 1000° to about 1400° C. to a temperature below about 600° C. The cooled effluent gas 23 then passes out of the heat exchange zone 21 through the exit ends of exchange tubes 2 and the hydrogen cyanide product is separated from the effluent stream through conventional means not shown.

As further shown in FIG. 8, the heat exchange zone 21 may be comprised of a refractory layer 27 with openings extending therethrough, which openings are aligned with openings in the entry tubesheet 4. The tubesheet 4 forms a wall of the heat exchange vessel 26 which contains the heat exchange medium 24. The heat exchange medium 24 is preferably water or a mixture of water and steam, but may be other fluids, as described above, suitable for absorbing energy transferred from the heated exchange tubes 2. The ferrules 22 rest in the openings in the refractory layer 27, pass through the openings in the entry tubesheet 4, and enter the entry ends of exchange tubes 2. Preferably, the openings in the refractory layer 27 are shaped to complement the exterior form of the ferrule 22.

The ferrule 22 is preferably surrounded by a separable or integral ferrule sleeve 31 positioned along the longitudinal axis of the ferrule 22. By "integral" is meant that the sleeve may be formed as a single piece of common material with, or fixedly attached to, the ferrule. It is preferred that the ferrule sleeve 31 be a separate component to accommodate any movement of the ferrule 22 relative to the ferrule sleeve 31, for example due to differential expansion during operations, without creating undesirable stresses within the materials. The ferrule sleeve 31 serves as a physical buffer between the ferrule 22 and the interior of the surrounding refractory layer 27. The ferrule sleeves 31 also may serve to position the ferrules 22 in the desired orientation over the entry end of the exchange tubes 2. At installation, the exterior of ferrule 22 and the interior of ferrule sleeve 31 may be coated with a thin layer of wax to aid in later removal of the ferrule.

In a conventional configuration, included within the scope of the invention, the entry ends of the exchange tubes 2 extend through the entry tubesheet 4 into the reactor vessel 33. In this embodiment, shown in FIG. 8, the exchange tubes 2 are affixed by a weld formed between the exterior of the exchange tube 2 and the upper surface of the entry tubesheet 4.

The following examples are presented to illustrate further various aspects of the present invention, but are not intended to limit the scope of the invention in any aspect.

EXAMPLE 1

A hydrogen cyanide reactor was constructed with a shell and tube heat exchanger. The entry tubesheet and heat exchange tubes of the heat exchanger were prepared from a nickel-chromium alloy (INCONEL 600). The entry end of the exchange tubes was flush with the upper surface of the entry tubesheet or the tube ends extended slightly beyond the upper surface of the entry tubesheet. The exchange tubes were welded to the upper surface of the entry tubesheet. A mixture of silicon nitride ferrules and nickel-chromium alloy ferrules (INCONEL 600) were placed in nickel-chromium alloy (INCONEL 600) ferrule sleeves and the ferrules were then inserted in the entry end of the exchange tubes. After approximately 4 months (about 2700 hours) of operation, with 15 operating cycles, that is thermal shocks, and several high temperature (>1200° C.) operating periods, one silicon nitride and one nickel-chromium alloy ferrule were removed and inspected for wear. Each operating cycle consisted of heating the ferrules during light-off from about 150° to 500° C. up to about 1200° to 1400° C. in about 1 minute and a later period of nitrogen quenching of the ferrules from approximately 1000° to 1400° C. to about 25° C.

The nickel-chromium ferrule was difficult to remove from the exchange tube and it showed appreciable length loss, approximately ½ inch (1.27 cm) from the original length. There were also large amounts of carbon/nitrogen deposits on the surface of this ferrule. The ferrule was physically trapped within the ferrule sleeve. This ferrule had also swelled from absorbing carbon/nitrogen, thus constricting the inner diameter of the ferrule.

The silicon nitride ferrule was easily removed from the exchange tube and showed no length loss. Some metal cyanide deposits were noted on the outside exit end of the ferrule. There was no visible internal wear nor swelling on the interior of the silicon nitride ferrule. Thus, the inner diameter of the silicon nitride ferrule was unchanged.

It can thus be seen that either a nickel-chromium ferrule or a silicon nitride ferrule protect the exchange tubes of a shell and tube heat exchanger from hot, reactive effluent gasses, particularly from effluent gasses in a hydrogen cyanide reactor.

EXAMPLE 2

The hydrogen cyanide reactor of Example 1 was operated for an additional 5 months. Again one silicon nitride and one adjacent nickel-chromium alloy ferrule were removed from the reactor and evaluated.

The nickel-chromium ferrule was difficult to remove from the exchange tube and it showed appreciable length loss, approximately 1 inch (2.54 cm) from the original length. There were also large amounts of carbon/nitrogen deposits on the surface of this ferrule. The ferrule was physically trapped within the sleeve. This ferrule had also swelled from absorbing carbon/nitrogen, thus constricting the inner diameter of the ferrule. Erosion patterns (wall thinning) were also visible on the interior of the ferrule.

The silicon nitride ferrule was easily removed from the exchange tube and showed no length loss. Some corrosion deposits, likely metal cyanide deposits, were noted on the outside of the ferrule. A dark carbon deposit was noted on the outside exit portion of the ferrule. Slight erosion occurred on the inlet ridge of the ferrule. There was no visible internal wear or swelling on the interior of the silicon nitride ferrule. Thus, the inner diameter of the silicon nitride ferrule was unchanged.

It can thus be seen that either a nickel-chromium ferrule or a silicon nitride ferrule protect the exchange tubes of a shell and tube heat exchanger from hot, reactive effluent gasses, particularly from effluent gasses in a hydrogen cyanide reactor.

EXAMPLE 3

The ferrules from Examples 1 and 2 were analyzed for weight loss and volume change. These results are reported in the Table below. The percentages reported were estimated by comparing the weight and volume of the ferrules from Examples 1 and 2 with that of a corresponding new ferrule.

| Ferrule | Months of Operation | Weight Change (%) | Volume Change (%) |
| --- | --- | --- | --- |
| Silicon Nitride | 4 | 2 | 0 |
|  | 9 | 4–5 | 0 |
| Nickel-chromium alloy | 9 | 9–10 | 9–10 |

Thus it can be seen that the silicon nitride ferrules of the present invention are very effective at protecting heat exchange tubes for long periods of time without any significant change in the dimensions of the ferrule.

EXAMPLE 4—COMPARATIVE

In the hydrogen cyanide reactor of Example 1, 4 aluminum oxide ferrules having the design shown in FIG. 5 were employed instead of the silicon nitride or nickel-chromium alloy ferrules. Two of the ferrules had a purity of 95% and the other 2 had a purity of 97%. After 4–5 months of operation, all 4 alumina ferrules were removed and inspected. In each case, the ferrule cracked or fractured in the neck region, that is, where the flared entry end met the pipe section. In some cases, the pipe section had completely separated from the flared section of the ferrule.

What is claimed is:

1. A process for preparing hydrogen cyanide comprising the steps of: feeding reaction gas to a reactor, the reaction gas comprising hydrocarbon, ammonia and optionally an oxygen-containing gas; reacting the reaction gas in the presence of a catalyst to give product gas; cooling the product gas in a heat exchange apparatus comprising (a) a shell having an entry tubesheet and an exit tubesheet, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident; and (c) a plurality of ferrules, each ferrule having an entry end and an exit end extending through an entry tubesheet hole into a tube wherein the exit end extends below the entry tubesheet, the ferrule comprising silicon nitride; and recovering hydrogen cyanide from the cooled product gas.

2. The process of claim 1 in which said entry end of each ferrule has a diameter greater than said tube; said diameter decreases in a first portion of each ferrule; in a second portion of each ferrule, an internal surface of each ferrule diverges toward said exit end at an angle of less than 30 degrees; and an external diameter of said exit end is smaller than that of said tube.

3. The process of claim 2 in which each tube is formed of a metal including carbon-steel or a nickel-chromium alloy, wherein each of said plurality of holes in said entry tubesheet comprises a first bore having a first diameter, said first bore extending partially through said entry tubesheet, and a second bore having a second diameter, said second bore extending from said first bore through said entry tubesheet to a tube-side face of said entry tubesheet, said first and second bores being coaxial, said first diameter being greater than said second diameter, said second diameter being greater than an outside diameter of a corresponding tube received therein, each tube being inserted into a corresponding second bore a distance equal to an axial length of said second bore, each tube being affixed to said second bore by a full-penetration weld formed between each tube and the tubesheet over said axial length of said second bore.

4. The process of claim 3 in which each tube is formed of a metal including a nickel-chromium alloy.

5. The process of claim 2 in which said angle is between 5 and 7 degrees.

6. The process of claim 2 in which the product gas is at a temperature of at least 1000° C.

7. A process for cooling a reducing, carburizing or nitridizing gas; said process comprising cooling said gas in a heat exchange apparatus comprising (a) a shell having an entry tubesheet and an exit tubesheet, each tubesheet having a plurality of holes, wherein the shell has at least one inlet and one outlet for heat exchange medium; (b) a plurality of tubes disposed within the shell wherein an entry end of each tube is affixed to the entry tubesheet and an exit end of each tube is affixed to the exit tubesheet such that an axis of the tube and an axis of an entry and exit tubesheet hole are coincident; and (c) a plurality of ferrules, each ferrule having an entry end and an exit end extending through an entry tubesheet hole into a tube wherein the exit end extends below the entry tubesheet, the ferrule comprising silicon nitride.

8. The process of claim 7 in which said reducing, carburizing or nitridizing gas is a carburizing or nitridizing gas.

9. The process of claim 8 in which said entry end of each ferrule has a diameter greater than said tube; said diameter decreases in a first portion of each ferrule; in a second portion of each ferrule, an internal surface of each ferrule diverges toward said exit end at an angle of less than 30 degrees; and an external diameter of said exit end is smaller than that of said tube.

10. The process of claim 9 in which each tube is formed of a metal including carbon-steel or a nickel-chromium alloy, wherein each of said plurality of holes in said entry tubesheet comprises a first bore having a first diameter, said first bore extending partially through said entry tubesheet, and a second bore having a second diameter, said second bore extending from said first bore through said entry tubesheet to a tube-side face of said entry tubesheet, said first and second bores being coaxial, said first diameter being greater than said second diameter, said second diameter being greater than an outside diameter of a corresponding tube received therein, each tube being inserted into a corresponding second bore a distance equal to an axial length of said second bore, each tube being affixed to said second bore by a full-penetration weld formed between each tube and the tubesheet over said axial length of said second bore.

11. The process of claim 7 in which said reducing, carburizing or nitridizing gas is a product of a steam-methane reformer.

* * * * *